United States Patent [19]

Walker

[11] 4,238,821

[45] Dec. 9, 1980

[54] METHOD AND APPARATUS FOR A VARIABLE FREQUENCY INVERTER SYSTEM HAVING COMMUTATION FAULT DETECTION AND CORRECTION CAPABILITIES

[75] Inventor: Loren H. Walker, Salem, Va.

[73] Assignee: General Electric Company, Salem, Va.

[21] Appl. No.: 32,854

[22] Filed: Apr. 24, 1979

[51] Int. Cl.$^3$ ............................................ H02H 7/122
[52] U.S. Cl. ........................................ 363/58; 363/37; 363/138; 318/803
[58] Field of Search .................................. 363/34–35, 363/37, 51, 54, 58, 96, 135–138; 318/798, 802–803, 805

[56] References Cited

U.S. PATENT DOCUMENTS

| | | | |
|---|---|---|---|
| 3,947,748 | 3/1976 | Klein | 363/57 |
| 4,150,325 | 4/1979 | Miller et al. | 363/54 X |
| 4,161,010 | 7/1979 | Mann et al. | 363/138 X |
| 4,183,081 | 1/1980 | Cutler et al. | 363/58 X |

Primary Examiner—William M. Shoop
Assistant Examiner—Peter S. Wong
Attorney, Agent, or Firm—Arnold E. Renner

[57] ABSTRACT

An inverter system including a controlled direct current (d.c.) power source for providing a variable d.c. voltage to a variable output frequency inverter circuit by way of a suitable d.c. link, includes suitable circuitry for detecting a commutation fault or shoot-through condition within the inverter circuit and for taking appropriate remedial action to correct such condition. The shoot-through condition is determined as a function of the d.c. input current to the inverter circuit and the output alternating current (a.c.) of the inverter circuit. This determination is achieved by comparing signals representing the two currents at a fixed ratio, other than unity (e.g, at a fixed percentage of one to the other) so that the actual margin increases as the currents increase. Preferably a bias is also included in the comparison function so that a minimum differential is always required before a shoot-through determination is made.

23 Claims, 5 Drawing Figures

METHOD AND APPARATUS FOR A VARIABLE FREQUENCY INVERTER SYSTEM HAVING COMMUTATION FAULT DETECTION AND CORRECTION CAPABILITIES

BACKGROUND OF THE INVENTION

The present invention relates generally to inverter systems and more particularly to an inverter system for supplying electrical power to a motor, which system includes novel circuitry for the detection and correction of commutation faults, often and more popularly called "shoot-throughs".

The variable power conversion unit currently most popular, whether direct current (d.c.) to alternating current (a.c.) or a.c. to d.c., employs a bridge arrangement of controlled rectifiers. Today's most commonly used controlled rectifier is of the semiconductor type, generically known as the thyristor, the most common form of which is the silicon controlled rectifier (SCR). In the remaining portion of this specification, the word "thyristor" will be used in tha generic sense and it is understood that this term is used to designate controlled rectifiers generally. The three phase version of the power conversion unit normally includes six thyristors in the customary bridge arrangement such that there are two series connected thyristors in each of three legs. These thyristors are normally rendered conductive in a prescribed sequence to control power from the source to the load. There are, however, occasions where one or more of the thyristors will fail to commutate or turn off at the proper time, thus resulting in an improper conductive situation. Viewed from the d.c. side of the bridge, when a thyristor fails to commutate there exists a direct short circuit across the d.c. buses because both thyristors of a leg are in the conductive condition. This is known as a commutation fault or more commonly, a shoot-through.

There are many causes of shoot-throughs but, regardless of origin, the ultimate cause is the failure of the thyristor current to reduce to a value where the thyristor will cease to conduct. The effect of the shoot-through on system performance varies with the type of inverter used. In the case of a voltage source inverter, a shoot-through generally requires the inverter to be shut down. In a current source inverter, so long as the shoot-through is of short duration, there is usually no adverse effect on either the thyristor or the overall control of the power supplied to the load. The majority if not most systems, therefore, include some form of shoot-through protection to detect and take corrective action when a shoot-through is imminent or has already occurred. This protective action can and does take on a variety of forms, the ultimate purpose of all being to reduce the thyristor current to a point where the thyristor will cease to conduct. The form of the particular system is often governed to a large degree by the nature of the conversion bridge and its control as well as, or in addition to, the nature of the load itself. Many such protection schemes are very complex and hence expensive. This is particularly true in very closely or precisely controlled systems which employ anticipatory schemes in an attempt to detect an incipient shoot-through and take preventive action with respect thereto before the shoot-through actually occurs. In other applications, however, the expense of such a scheme is not warranted since the existence of a shoot-through, so long as it is not allowed to continue, does not seriously affect the overall system performance. As an example, in extremely large motor drives where the inertia of the system inherently makes the response time of the system relatively slow, transient shoot-throughs which are corrected within a portion of a cycle do not seriously or adversely affect overall system performance.

SUMMARY OF THE INVENTION

It is, therefore, an object of the present invention to provide an improved method and apparatus, for a variable frequency inverter system, having commutation fault detection and correction capabilities.

It is another object to provide an improved method and apparatus for the detection and correction of shoot-throughs in an inverter system.

A further object is to provide a method and apparatus for the detection and correction of commutation faults or shoot-throughs for use with a controlled current inverter drive for an a.c. motor.

Another object is to provide a method and apparatus for the detection and correction of shoot-throughs for use with controlled current inverter drives for an a.c. motor, which detection and correction scheme functions through the sensing of the easily obtained system operational parameters.

Briefly, the foregoing and other objects are achieved in accordance with the present invention by providing an inverter system which includes a controlled d.c. power source to provide a variable d.c. current to a variable output frequency inverter circuit by way of a suitable d.c. link. The system further includes circuitry for the detection of a commutation fault or shoot-through within the inverter circuit and for taking appropriate remedial action to correct such a condition. The circuitry and method employed first determines the value of the d.c. current within the connecting link and the value of the output current of the inverter circuit to provide two current feedback signals which, under normal operating circumstances of the system are approximately equal in absolute magnitude. These two feedback signals are combined at a fixed ratio, other than unity, and serve to generate a correction signal when they reach a prescribed relationship which is indicative of a shoot-through. This correction signal is used to reduce the d.c. current in the connecting link. In the preferred embodiment, a bias signal of fixed magnitude is also combined with the two feedback signals to provide a noise or transient tolerance margin.

BRIEF DESCRIPTION OF THE DRAWING

While the present invention is particularly defined in the claims annexed to and forming a part of this specification, a better understanding can be had from the following description taken in conjunction with the accompanying drawings in which:

DETAILED DESCRIPTION

Figure 1:
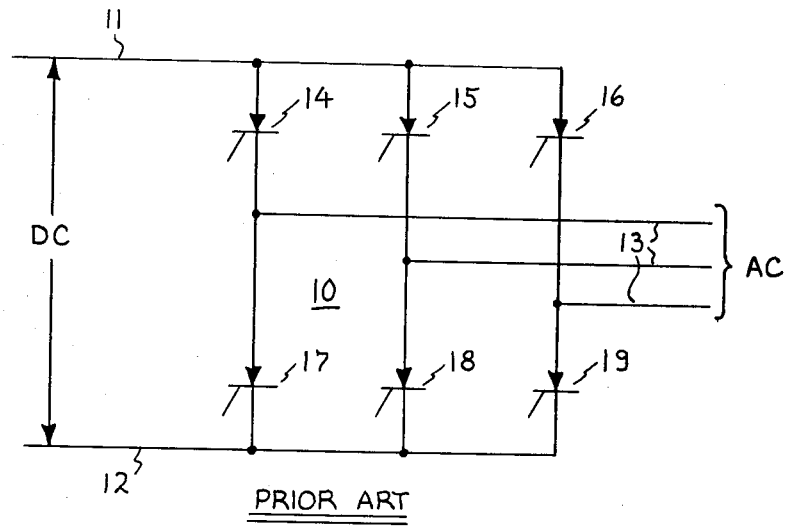
FIG. 1 is a schematic diagram illustrating the basic components of an electrical power conversion system employing semiconductor controlled rectifiers or thyristors as is well known in the art.

Prior to beginning an actual description of the present invention, it is believed appropriate to provide a brief discussion of the prior art structures which can find use in the present invention. Referencing first FIG. 1, there is shown the basic form of the three phase/d.c. power conversion unit 10. The unit 10 includes d.c. buses 11 and 12 across which the d.c. voltage either appears or is presented. Similarly, a.c. buses 13 present or receive a.c. power all in accordance with the direction of conversion. The fundamental conversion unit is comprised of six thyristors 14 through 19 which are arranged in a bridge arrangement. As is well known, if d.c. is applied to the buses 11 and 12, the appropriate firing or rendering conductive of the thyristors of the bridge will cause an a.c. voltage to be presented on the buses 13. Conversely, if a.c. is presented on buses 13, then by the appropriate control of the thyristors 14 through 19 of the bridge 10, the magnitude of the d.c. voltage appearing on buses 11 and 12 can be controlled. This control is normally achieved by what is commonly called "phase controlling" which amounts to the rendering conductive of the thyristors of the bridge at a variable point within the applied a.c. sine wave so as to vary the output voltage.

Figure 2:
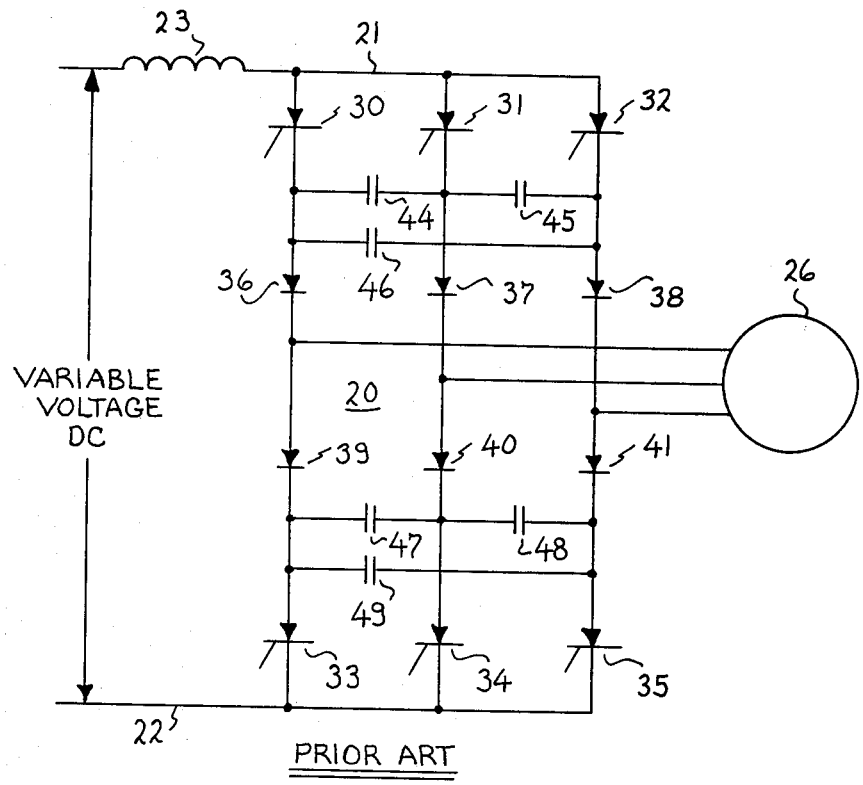
FIG. 2 is a schematic diagram illustrating the basic components of a controlled current inverter as is known in the art and as may be used in the implementation of the present invention.

FIG. 2 shows the basic form of a typical controlled current inverter for supplying a variable current, variable frequency power to a load. In FIG. 2, a variable d.c. voltage (and thus a variable d.c. current) is applied by way of buses 21 (including an inductor 23) and 22 to the inverter circuit shown generally at 20 which, in turn, supplies variable electrical power to a load 26 which, in the present illustration as is often the case, may be an a.c. induction motor. Inverter circuit 20 is comprised of, in the three phase embodiment illustrated, six thyristors 30 through 35 disposed in a basic bridge arrangement. Thyristors 30, 31 and 32 form the basic part of which is customarily considered to be the positive half of the bridge while thyristors 33, 34 and 35 form the basic part of the negative side of the inverter bridge. The bridge illustrated in FIG. 2 has three legs with the first leg including thyristors 30 and 33 and further including a pair of series connected diodes 36 and 39. In a like manner, the second leg includes thyristors 31 and 34 and a pair of series connected diodes 37 and 40 while the third leg includes thyristors 32 and 35 and series connected diodes 38 and 41. Commutating capacitors are associated; i.e., connected, between each pair of diodes. That is, a first commutating capacitor 44 is connected between the cathodes of thyristors 30 and 31 while a capacitor 45 is connected between the cathodes of thyristors 31 and 32. The third commutating capacitor 46 in the positive part of the inverter circuit is connected between the cathodes of thyristors 30 and 32. In a similar manner, commutating capacitors 47, 48 and 49 are connected between respective pairs of the anodes of thyristors 33, 34 and 35. The gating on (rendering conductive) of the thyristors 30 to 35 of the basic inverter circuit 20 is a function of gating signals, applied to the gate electrodes thereof by suitable leads, which carry signals derived from a gating control, not shown in FIG. 2.

Figure 3:
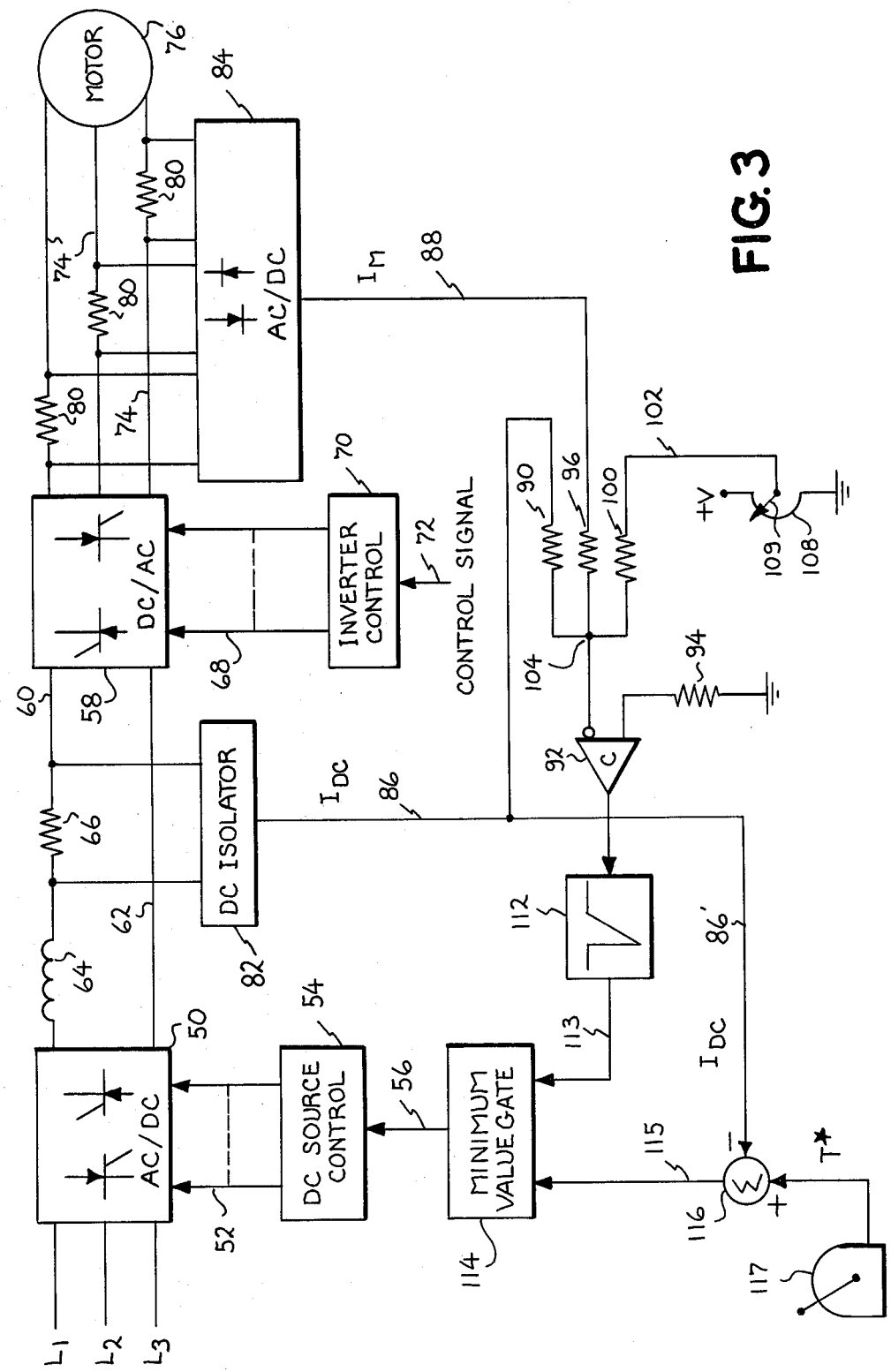
FIG. 3 is a schematic diagram partially in block form illustrating the present invention in its preferred embodiment.

FIG. 3 illustrates the present invention in its preferred embodiment. Referencing now that figure, it is seen that there is provided a variable voltage d.c. source 50 which may be of the basic type as that described with respect to FIG. 1. As such, power to the variable d.c. source 50 is shown as being supplied from an a.c. source indicated by the lines $L_1$, $L_2$ and $L_3$. Control of the source 50 is by way of suitable input lines 52 from a d.c. source control 54. The nature of the source control 54 will, of course, depend upon the type of variable d.c. power source 50. In the event, for examle, that the source 50 is of the type illustrated in FIG. 1, lines 52 represent gate leads and the d.c. source control 54 could be of the ramp and pedestal type to thus provide a variable output from the source 50 in accordance with the value of an input signal on line 56 to the control 54. (It is, of course, to be expressly understood that other forms of d.c. voltage or current sources could be used so long as they are responsive and variable to an input control signal). The variable d.c. source 50 is connected to a three phase inverter circuit 58 by way of a d.c. link having conductors 60 and 62 and further including an inductor 64 and a low resistance shunt 66. The inverter 58 is preferably of the controlled current type such as was described with respect to FIG. 2 and is under the control of suitable control signals delivered by way of lines 68 which originate in an inverter control 70. Inverter control 70 receives a control command or signal by way of an input line 72. Assuming that inverter 58 is of the type earlier described, the signals on line 68 would serve to render conductive the thyristors of the inverter bridge to provide an output power, by way of lines 74, to a suitable load shown as a motor 76. The exact nature of the control 70 is not of prime importance to the present invention but, in a typical system, could include a ring counter which is supplied with pulses from a suitable source such as a voltage controlled oscillator which would receive, as an input, a voltage signal on line 72 which is indicative or proportional to the desired frequency of operation of the inverter 58. Low resistance shunts 80 are located in each of the lines 74 which supply electrical power to the load 76 for purposes to be explained.

In accordance with the present invention, there is provided a first current feedback signal, in FIG. 3 designated $I_{DC}$, which has as its origin with the shunt 66 located in the d.c. link. As was earlier stated, the shunt 66 is of a low value and will, therefore, develop a voltage across it proportional to the value of the current flowing in that d.c. link. This voltage is developed by way of any suitable d.c. isolator circuit 82 such that there appears, at the output of the isolator (line 86), the feedback signal $I_{DC}$ which is a signal having a value proportional to the current in the d.c. link.

The second feedback signal utilized in the system of the present invention is also a current feedback signal, designated $I_M$, which has a value proportional to the load (motor) current. To this end, the three shunts 80 located in the lines 74 are provided such that there appears, across the three shunts, voltage signals proportional to the instantaneous currents existing within those lines. These signals are applied to a suitable three phase a.c. to d.c. rectifying bridge and isolator circuit 84, the output of which is the $I_M$ signal (line 88).

Normal circuit theory would indicate that when the system supplying the motor was operating properly, the two signals, $I_{DC}$ and $I_M$, when appropriate compensation is made for various circuit losses, would be equal.

This same theory would indicate that if a commutation fault or shoot-through were to occur in the inverter, the current $I_{DC}$ would tend to be shunted by the inverter, bypassing the motor. The $I_M$ signal would tend to fall off toward zero at a rate largely dependent upon the overall inductive reactance of the load circuit. Thus, the shoot-through could be detected by sensing the difference between $I_{DC}$ and $I_M$. This normal theory is basically true and is employed in the present invention. It should be noted, however, that in many systems it is desired to keep a small current flowing in the motor at all times, even when the motor is not turning (idle condition), so as to maintain flux within the motor to assure a faster response time. If a shoot-through were to occur at idle, therefore, because $I_{DC}$ may be a very small value, a relatively small difference would exist between the $I_{DC}$ and $I_M$ current feedback signals. This small difference between $I_{DC}$ and $I_M$ may not indicate a shoot-through at all conditions, however, since it has been found that when the inverter circuit is operated at higher frequencies, the difference between the two feedback signals $I_{DC}$ and $I_M$ increases during proper operation. This is because the commutating capacitors within the controlled current inverter circuit begin to absorb a portion of the current $I_{DC}$ which then is not switched into the motor load. This is a phenomenon which becomes increasingly large as the operating frequency increases.

Thus, a shoot-through can be detected by sensing a difference between $I_{DC}$ and $I_M$, but the detection must be insensitive to small differences which occur at high frequency operation of the inverter. If, however, the desired operating current of the motor is very small, as might occur at standstill ("idle" operation) of the motors, then a shoot-through which occurs will cause $I_M$ to fall to zero, but the difference between $I_{DC}$ and $I_M$ may be very small. In order to detect a shoot-through in this case, the detector must be sensitive to very small differences in $I_{DC}$ and $I_M$. To accommodate both the high speed and low current idle conditions, the shoot-through detector must be able to distinguish between the levels of current difference in the two basic operating conditions.

This is achieved, in accordance with the present invention, by beginning with feedback signals $I_{DC}$ and $I_M$ which are approximately equal during normal operating conditions and combining (e.g., comparing) these two signals at a fixed relative percentage or at a fixed ratio whereby at the comparison point the $I_M$ feedback signal appears larger than $I_{DC}$ under these normal conditions. Preferably, a noise margin bias is also added to lend system stability.

The preferred embodiment for achieving this function is shown in FIG. 3. The $I_{DC}$ signal appearing on line 86 forms one input, via an input resistor 90, to the inverting input (junction 104) of a suitable comparator operational amplifier 92 which has its non-inverting input connected to ground by way of a resistor 94. For purposes of this illustration it will be assumed that the $I_{DC}$ signal as it issues from the d.c. isolator 82 is a negative signal whose absolute magnitude varies directly proportional to the magnitude of the d.c. current as sensed by the shunt 66 as earlier explained. (An equally viable method of sensing d.c. current, which is well known, is to develop the current signal from current transformers situated in lines $L_1$, $L_2$ and $L_3$.) The second current feedback signal, that proportional to the motor current $I_M$, appears on line 88 as a positive signal and forms a second input to the inverting input of the amplifier 92 by way of a suitable input resistor 96. As earlier indicated, the absolute magnitude value of the $I_M$ signal will, in normal operating conditions, be of the same order of magnitude although normally slightly less than the absolute magnitude of the signal $I_{DC}$ and the amount of differential is dependent upon the operating condition of the load or motor 76. When a shoot-through or commutation fault exists, this differential will be considerably larger. The reference or bias signal earlier mentioned is derived from a suitable source shown as a potentiometer 108 which is connected between a source of positive potential and ground. The setting of wiper arm 109 of the potentiometer 108 determines the value of the bias signal and this signal is applied via line 102 and resistor 100 to the inverting input of amplifier 92 at junction 104.

In accordance with the present invention, and as will be more fully understood as this description proceeds (including the following discussion of FIGS. 4 and 5) the two feedback signals $I_{DC}$ and $I_M$ appear at the junction 104, and hence the inverting input of amplifier 92, at a fixed percentage or ratio with respect to one another. A typical ratio of $I_{DC}$ to $I_M$ would be 7 to 10 (i.e., $I_{DC}$ would have 70 percent of the effect of $I_M$ for signals of the same magnitude). This is achieved, in the FIG. 3 illustration, by scaling the respective resistors 90 and 96 in the inverse proportion. That is, for example, if resistor 96 were 70 ohms, resistor 90 would be 100 ohms. Thus, the output of amplifier 92 will change its output state as a function of percentage of difference between the two feedback signals and not a a function of the absolute magnitude of this difference.

As an example, ignore for the moment the bias signal and assume a normal operating condition in which full rated current exists in the system and results in an $I_{DC}$ signal of $(-)$ 100 units and $I_M$ signal of $(+)$ 100 units. At junction 104, $I_{DC}$ will appear as $(-)$ 70 units and $I_M$ will appear as $(+)$ 100 units, a $(+)$ 30 unit differential, and the output of amplifier 92 will be negative. Assume now a shoot-through condition in the inverter which, for sake of simplicity, does not affect the d.c. link current but causes a sudden drop in the load current and hence in the $I_M$ feedback signal. In this example, as soon as $I_M$ drops more than 30 units, say to $(+)$ 69 units, the net voltage at junction 104 will be negative and the amplifier will switch its output to the positive state to initiate the remedial action to be described hereinafter.

As a second part of this example, next assume that the system is in a very low power mode of operation and the two feedback signals $I_{DC}$ and $I_M$ are, respectively, at $(-)$ 10 units and $(+)$ 10 units. From the foregoing, it is seen that a 3 unit drop in $I_M$ will not trigger a change in the output of amplifier 92. Thus, the desired objective of requiring low differentials at low operating levels and high differentials at high operating levels has been achieved.

In the example thus far, the reference or bias signal applied by way of resistor 100 has been ignored. It is obvious from the foregoing discussion that, as the system current approaches zero, the differential required to cause a change in the output of amplifier 92 also approaches zero. Since no system such as here being discussed is without irregular variances from temperature changes, aging, etc. and especially since none is, in a practical embodiment, immune from electrical noise and other transients, it is apparent that some margin is desirable to prevent "nuisance" operation of the correction system. This is the function of the bias signal. By making this bias a constant positive value, it is seen that even at zero system current, a finite differential will be required to switch the output state of amplifier 92. Since the bias is a constant, the bias effect will be relatively small at higher operating power levels. While the value of the bias signal is, in a sense, arbitrary or dependent upon the system components and operational requirements, a typical value to be employed is 5 percent of the full system rating. In the example above resulting in an $I_M$ signal of (+) 100 units at junction 104, the bias signal will present (+) 5 units to that junction. This then changes the differentials required in the examples above from 30 and 3 to 35 and 8.

Figure 4:
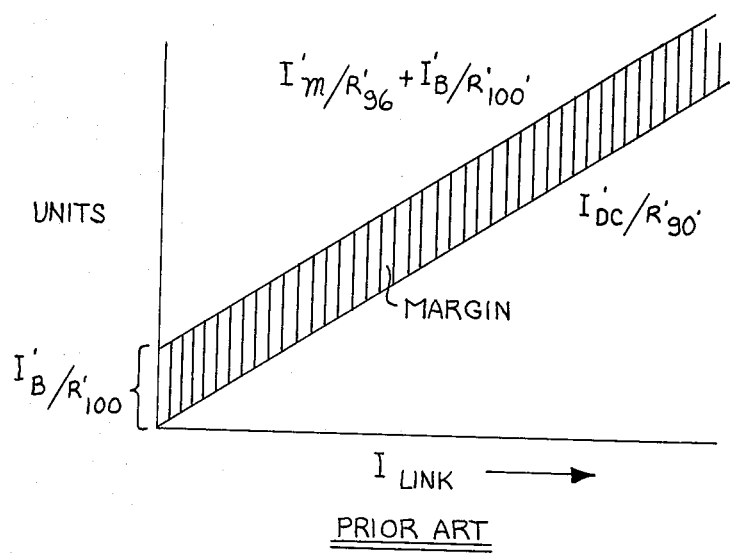
FIG. 4 is a graph illustrating one conceptual method of shoot-through detection in accordance with the prior art.
Figure 5:
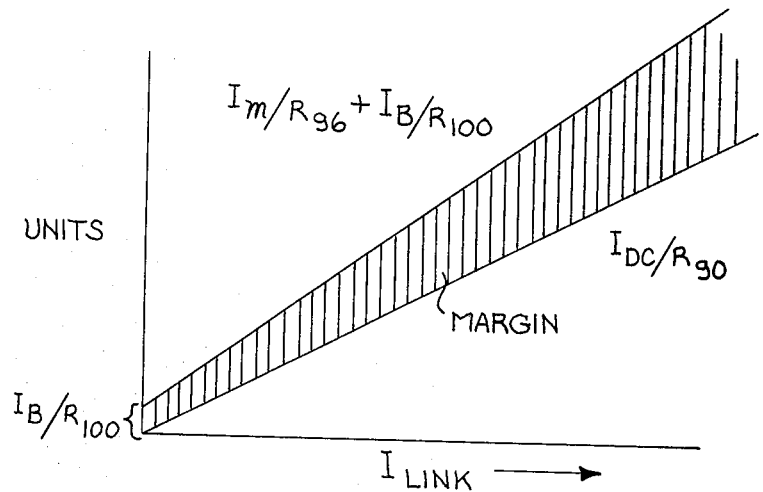
FIG. 5 is a graph illustrating the shoot-through detection scheme in accordance with the present invention.

FIGS. 4 and 5 graphically demonstrate, respectively, the prior art and present invention systems. In both cases, the d.c. link current ($I_{LINK}$) forms the abscissa while the signal units appearing at a summing point forms the ordinate. Also in both cases, all signals have been shown in the positive sense for easier understanding. FIG. 4 which demonstrates the prior art system will be assumed to have been derived from a physical structure similar to that shown in FIG. 3 but without the ratio scaling of signals specified by the present invention. For ease of comparison, present invention designations with prime notations will be used. In FIG. 4, the line $I_{DC}'/R_{90}'$ shows the increase of units at the junction with an increase in link current. A constant offset or bias is demonstrated by the vertical distance $I_B'/R_{100}'$. The line $I_M'/R_{96}' + I_B'/R_{100}'$ represents the sum of the units from the bias and the inverter output current is is shown increasing with the link current and parallel to line $I_{DC}'/R_{90}'$. It is noted that since the bias must be sufficient to suppress noise effects at all levels of operation and since these effects can be fairly large at high power levels, the spread or margin between the lines (i.e., the bias value) is fairly large. This is not a desirable feature at low power levels since, at these lower feedback signal levels, the noise tends to be at lower levels. In this illustration, if a shoot-through were to occur reducing the $I_M'$ signal, the upper line could drop on the vertical scale and, when it drops below the $I_{DC}'/R_{90}'$ line the amplifier would change its output.

FIG. 5 when compared to FIG. 4 is believed to clearly demonstrate the advantages of the present invention. Note first the divergence of the two lines as the d.c. link current increases. This is due, as earlier described, to the percentage or ratio feature of this invention. Note also that the bias $I_B/R_{100}$ signal need not be so large since the divergence of the system automatically provides a larger "margin" at higher power levels where the noise is apt to be of higher magnitude. Thus, by the ratio feature the present invention is able to respond more accurately to fault conditions at low power levels while retaining a sufficient margin at high power levels so as to avoid apparent faults due to such factors as electrical noise, etc.

Returning to FIG. 3, it is seen that the output of amplifier 92 is applied as an input to a function generator 112 which, in the preferred embodiment, provides a negative saw-tooth wave output signal. That is, in response to a positive input, indicating a shoot-through condition, from the amplifier 92 the output of the generator 112 (line 113) will drop suddenly from its quiescent value and then begin to slowly ramp back to its quiescent value. The output of the function generator 112 is applied as one input to a minimum value gate 114 to which is also applied the normal control signal (line 115) for the variable voltage d.c. source. The minimum value gate 114 may be of any suitable form such as a pair of parallel connected diodes each receiving a one of the signals on lines 115 and 113 and having their anodes connected, by way of a resistor, to a positive potential such that the output of the minimum value gate 114 which appears on line 56 is the more negative or smaller of its two input signals. Since the d.c. source control 54 responds to the value of its input on line 56 and since the control 54 effects a lesser output voltage from the variable d.c. source 50 in response to a more negative signal, it is seen that by the proper scaling of the values on lines 113 and 115 when the output signal of the amplifier 92 indicates a fault or shoot-through condition the minimum value gate 114 will turn control over to the signal from the function generator 112 (line 113) to thus reduce the voltage from the d.c. source 50 and hence reduce the current in the d.c. link to zero. The reduction of the d.c. link current to the inverter circuit 58 will cause a corresponding reduction in the inverter current to zero and allow the improperly conducting thyristor to the inverter circuit to cease to conduct.

The normal control signal on line 115 is the output signal of a summing junction 116 which receives as one input the negative $I_{DC}$ signal (line 86') to form a current feedback loop and as a second input a positive signal from a suitable operator control 117. The control 117 is set to achieve desired system performance and provides a signal T* proportional to desired output torque of the motor.

Thus, it is seen that there has been provided a system for correction of a commutation fault or shoot-through which, by the proper percentage application or ratioing of easily obtained feedback signals, provides effective and rapid fault recognition, and correction, over the full range of operating conditions.

While there has been shown and described what is at present considered to be the preferred embodiment of the present invention, modifications thereto will readily occur to those skilled in the art. For example, although a motor load has been shown, the present invention has general applicability to systems in which regardless of the load type there is a variation in operational load status. Obviously, if other types of loads were to be used, different forms of sensing of status might need to be employed. It is also apparent that the specific ratio values and the relative value for the bias signal can be varied in accordance with the overall system design and desired operational features. It is not desired, therefore, that the invention be limited to the specific arrangement shown and described and it is intended to cover within the appended claims all such modifications as fall within the true spirit and scope of the invention.

What is claimed is:

1. An inverter system for supplying controlled output voltage current and frequency electrical power to a load comprising:
   (a) a source of variable direct current power for providing a d.c. output current;
   (b) control means for controlling the d.c. output current of said source;
   (c) an inverter circuit for receiving said d.c. output current and for providing an a.c. output current of controlled frequency and voltage and current for application to said load;
   (d) a d.c. link circuit for carrying said d.c. output current from said source to said inverter circuit; and, (e) circuit means for detecting a commutation fault condition within said inverter circuit comprising,
  (1) means to produce a first feedback signal proportional to the magnitude of the d.c. current in said d.c. link circuit,
  (2) means to produce a second feedback signal proportional to the magnitude of the a.c. output current of said inverter circuit,
  (3) comparison means for comparing said first and second feedback signals at a fixed ratio other than unity, with respect to their absolute magnitudes, and to provide, in response to a prescribed relationship therebetween, a correction signal, and,
  (4) means for applying said correction signal to said control means to effect a reduction in the magnitude of the d.c. output current of said source.

2. The invention in accordance with claim 1 including means to establish said ratio of said first feedback signal to said second feedback signal of approximately 7 to 10.

3. The invention as defined in claim 1 wherein said comparison means comprises an operational amplifier and wherein said first and second feedback signals serve as input signals to said amplifier and are applied at an absolute magnitude ratio of approximately 7 to 10.

4. The invention in accordance with claim 1 wherein said last recited means includes:
  (a) generator means for providing a control pulse of prescribed duration and shape; and,
  (b) gating means for selectively applying said control pulse to said control means to thereby effect a reduction in the magnitude of the d.c. output current of said source of direct current power.

5. The invention in accordance with claim 4 wherein said generator means comprises a function generator to generate a substantially saw-tooth shaped control pulse.

6. The invention in accordance with claim 1 further including bias means for supplying a bias signal to said comparison means whereby said prescribed relationship to generate said correction signal is maintained at a minimum value proportional to the value of said bias signal.

7. The invention in accordance with claim 1 further including:
  (a) means to establish said ratio of said first feedback to said second feedback signal of approximately 7 to 10; and,
  (b) bias means for supplying a bias signal to said comparison means whereby said prescribed relationship to generate said correction signals is maintained at a minimum value proportional to the value of said bias signal, said minimum value being approximately 0.5 in respect to said ratio of 7 to 10.

8. The invention in accordance with claim 1 wherein said inverter circuit is a polyphase controlled current inverter circuit including controlled rectifiers and commutation capacitors connected between selected pairs of said rectifiers.

9. A commutation detection and correction system for use with a polyphase alternating current motor drive system in which an alternating current motor is supplied with controlled frequency alternating current from a controlled current inverter circuit which receives direct current power from a variable direct current source by way of a direct current link circuit, comprising:
  (a) means associated with said direct current link to provide first feedback signal as a function of the current in said link;
  (b) means to develop a second feedback signal as a function of said controlled frequency alternating current;
  (c) comparison means for comparing said first and second feedback signals at a fixed ratio other than unity, with respect to their absolute magnitudes, and to provide, in response to a prescribed relationship therebetween, a correction signal; and,
  (d) means responsive to said correction signal to effect a reduction in the direct current in said link circuit.

10. The invention in accordance with claim 9 further including control means for controlling the magnitude of the direct current in said link circuit and wherein said last recited means includes:
  (a) generator means for providing a control pulse of prescribed duration and shape; and,
  (b) gating means for selectively gating said control pulse to said control means to thereby effect a reduction in the magnitude of the direct current in said link circuit.

11. The invention in accordance with claim 10 wherein said generator means comprises a function generator to generate a substantially saw-tooth shaped control pulse.

12. The invention in accordance with claim 9 including means to establish said ratio of said first feedback signal to said second feedback signal of approximately 7 to 10.

13. The invention as defined in claim 9 wherein said comparison means comprises an operational amplifier and wherein said first and second feedback signals serve as input signals to said amplifier and are applied at an absolute magnitude ratio of approximately 7 to 10.

14. The invention in accordance with claim 9 further including bias means for supplying a bias signal to said comparison means whereby said prescribed relationship to generate said correction signal is maintained at a minimum value proportional to the value of said bias signal.

15. The invention in accordance with claim 9 further including:
  (a) means to establish said ratio of said first feedback to said second feedback signal of approximately 7 to 10; and,
  (b) bias means for supplying a bias signal to said comparison means whereby said prescribed relationship to generate said correction signals is maintained at a minimum value proportional to the value of said bias signal said minimum value being approximately 0.5 in respect to said ratio of 7 to 10.

16. A method of supplying electrical power to a load said electrical power being controlled in voltage, current and frequency comprising the steps:
  (a) developing a variable direct current as a function of a controllable input signal;
  (b) delivering said direct current by way of a direct current link circuit to an inverter circuit;
  (c) operating said inverter circuit in a controlled output mode in response to an input control signal to provide controlled frequency voltage and current power for delivery to said load;
  (d) detecting and correcting for commutation faults occurring within said inverter circuit by means of the steps of, (1) producing a first feedback signal proportional to the magnitude of the direct current supplied to the inverter circuit, (2) producing a second feedback signal proportional to the magnitude of the output current of the inverter circuit, (3) combining said first feedback and said second feedback signal at a fixed ratio value other than unity, with respect to their instantaneous absolute magnitude, to produce a correction signal in response to a prescribed relationship therebetween, and, (4) reducing said direct current signal as a function of the existence of the said correction signal.

17. For use in a polyphase alternating current motor drive system in which an alternating current motor is supplied with controlled frequency alternating current from a controlled current inverter which receives direct current power from a variable direct current source by way of a direct current link circuit, the method of detecting and correcting for commutation faults existing within said inverter comprising the steps of:

(a) developing a first feedback signal as a function of the current in said direct current link;

(b) developing a second feeback signal as a function of the output current of said inverter;

(c) combining said first and second feedback signals at a fixed ratio value other than unity, with respect to their instantaneous absolute magnitudes, to produce a correction signal in response to a prescribed relationship therebetween; and, (d) reducing the value of the direct current flowing within said link in response to the occurrence of said correction signal.

18. The method in accordance with claim 16 further including the step of providing a bias signal for combining with said first and second feedback signals, said bias signal serving to maintain said prescribed relationship at a minimum value.

19. The method in accordance with claim 17 further including the step of providing a bias signal for combining with said first and second feedback signals, said bias signal serving to maintain said prescribed relationship at a minimum value.

20. The method in accordance with claim 16 wherein said step of combining said first and second feedback signals is performed at a ratio value of approximately 7 to 10.

21. The method in accordance with claim 17 wherein said step of combining said first and second feedback signals is performed at a ratio value of approximately 7 to 10.

22. The method in accordance with claim 16 wherein said step of combining said first and second feedback signals is performed at a ratio value of approximately 7 to 10 and further including the step of providing a bias signal for combining with said first and second feedback signals, said bias signal being approximately 0.5 in respect to said ratio of 7 to 10.

23. The method in accordance with claim 17 wherein said step of combining said first and second feedback signals is performed at a ratio value of approximately 7 to 10 and further including the step of providing a bias signal for combining with said first and second feedback signals, said bias signal being approximately 0.5 in respect to said ratio of 7 to 10.

* * * * *